June 13, 1967  B. N. WILLIS  3,324,912
APPARATUS FOR SECTIONIZING FRUIT
Original Filed March 9, 1961  3 Sheets-Sheet 1
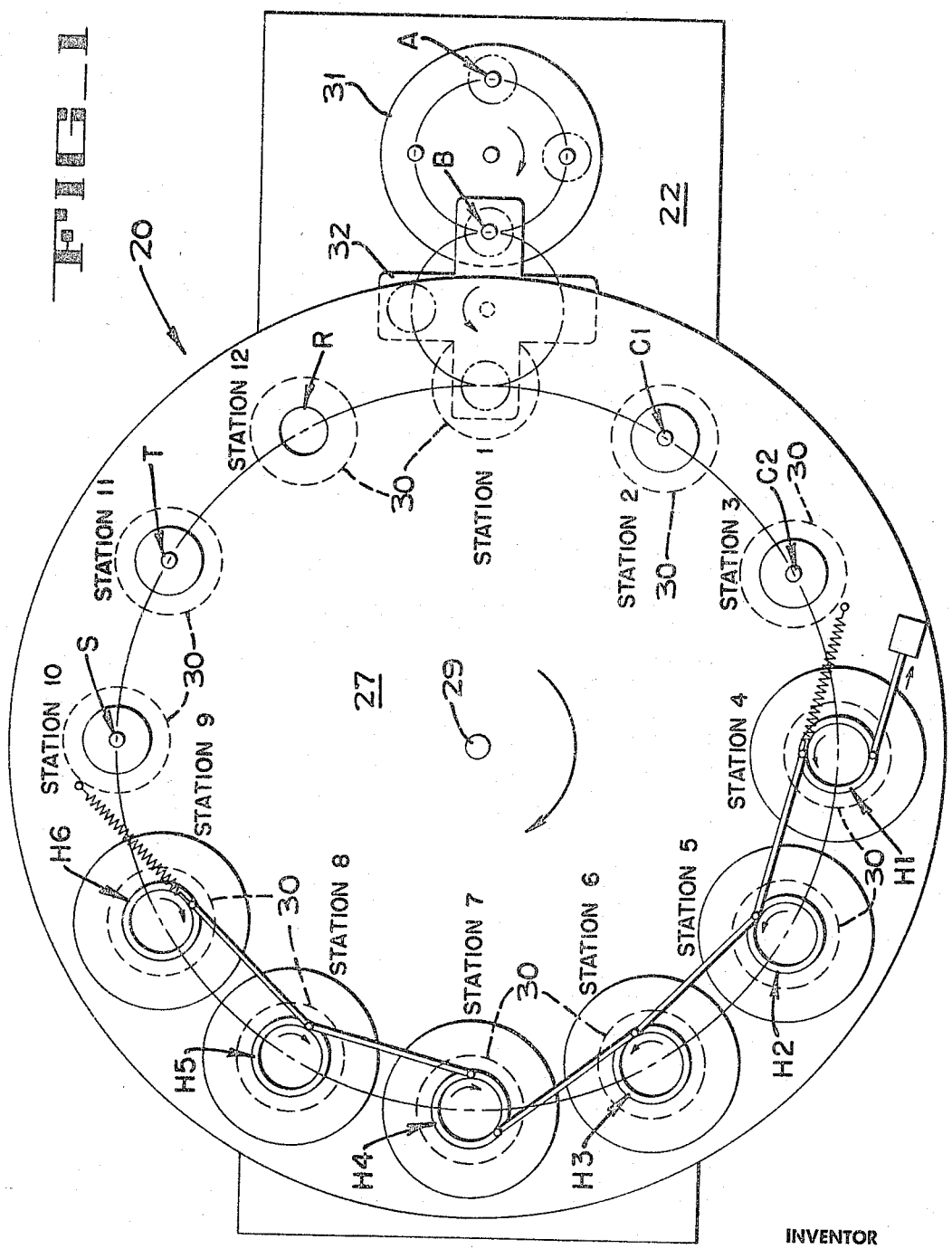
INVENTOR
BEUFORD N. WILLIS
BY Hans F. Hoffmeister
ATTORNEY

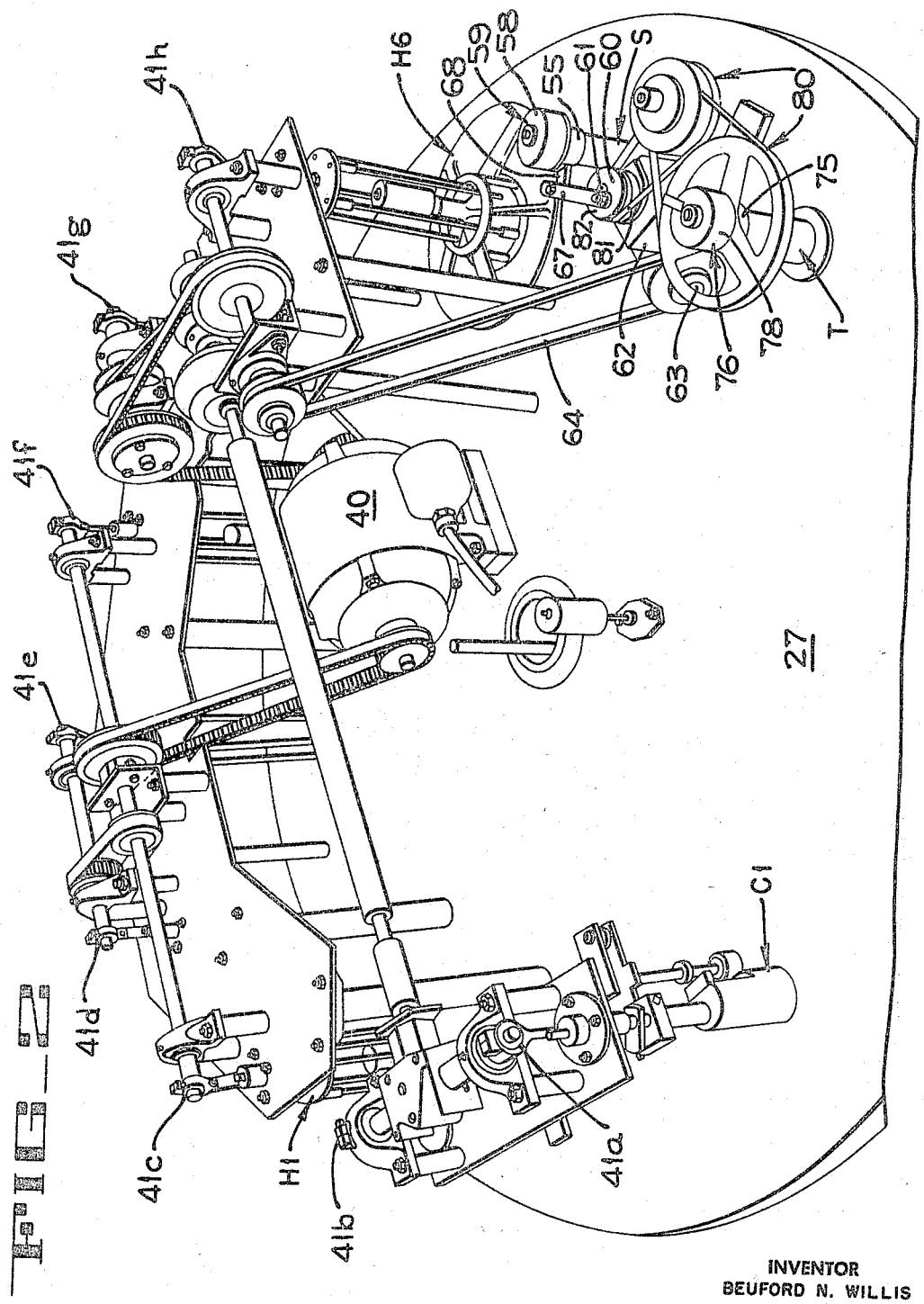

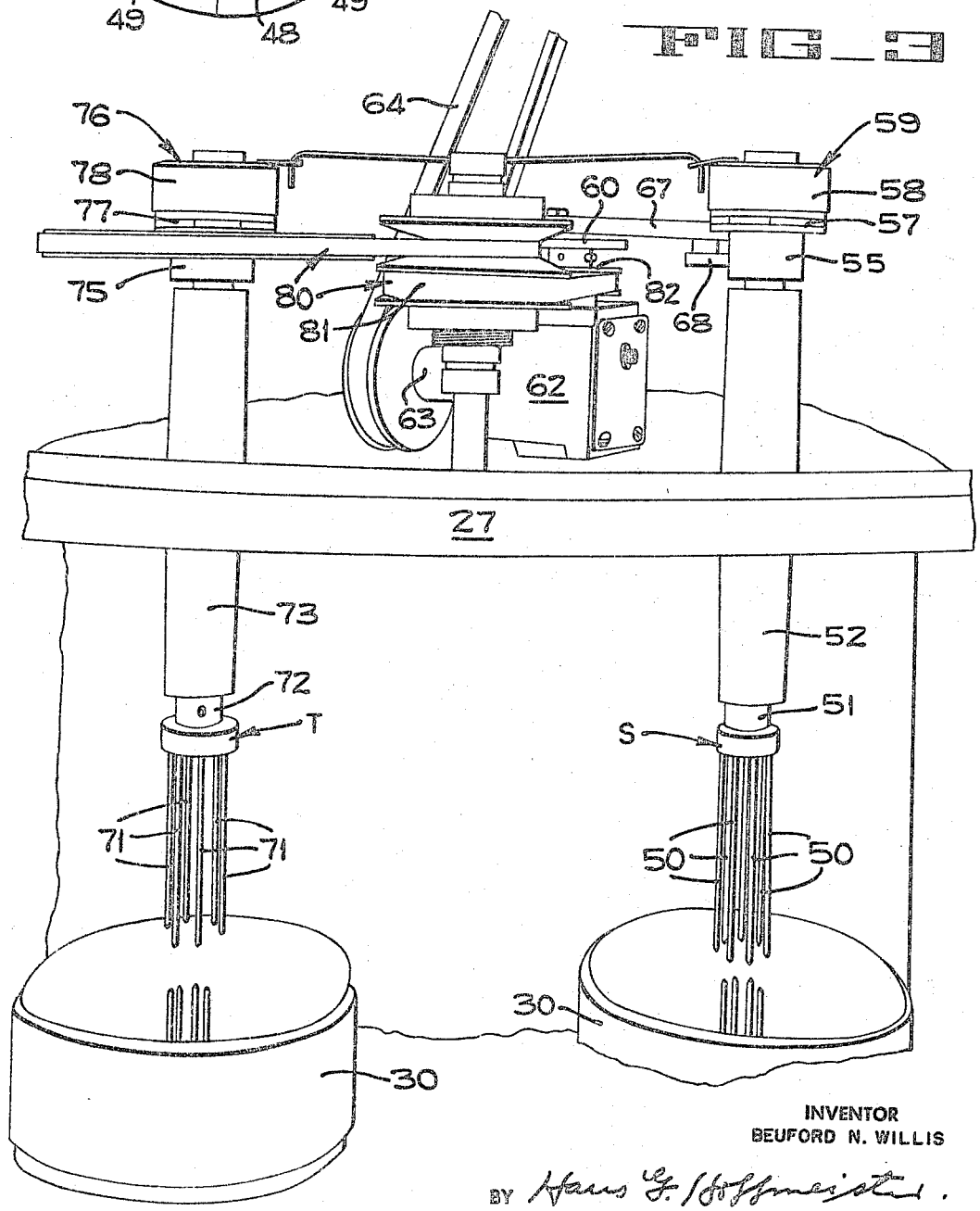

United States Patent Office 3,324,912
Patented June 13, 1967

3,324,912
APPARATUS FOR SECTIONIZING FRUIT
Beuford N. Willis, Lakeland, Fla., assignor to FMC Corporation, San Jose, Calif., a corporation of Delaware
Original application Mar. 9, 1961, Ser. No. 109,797, now Patent No. 3,148,717, dated Sept. 15, 1964. Divided and this application July 15, 1964, Ser. No. 382,724
3 Claims. (Cl. 146—3)

The present invention pertains to apparatus for sectionizing citrus fruit and more particularly concerns an improved apparatus for separating seeds from citrus fruit sections, and for separating fruit section from the core and membranes of the fruit.

This application is a division of my pending application Ser. No. 109,797, filed Mar. 9, 1961, now Patent No. 3,148,717.

In the above-identified parent application, a citrus fruit sectionizing machine is disclosed wherein each peeled grapefruit is held in a fruit holder while sectionizing blades are projected into the fruit and vibrated vertically to separate the sections from the central core and from the radial membranes. In actual operation it is possible that, after the blades have passed through the fruit, some of the fruit sections will still have small points of attachment to the membranes and to the core. Also, while many of the seeds of the fruit are loosened and separated from the fruit during the movement of the blades through the fruit, some seeds still remain attached to the fruit sections adjacent the core.

Accordingly, it is an object of the present invention to provide an improved citrus fruit sectionizing apparatus.

Another object is to provide an efficient seed removing mechanism for a citrus fruit sectionizing machine.

Another object is to provide a novel efficient mechanism for shaking a citrus fruit to complete the separation of fruit sections from the core and membranes of the fruit.

Other and further objects and advantages of the present invention will be apparent from the following description taken in connection with the accompanying drawings in which:

FIGURE 1 is a schematic top plan view of a sectionizing machine incorporating the shaker mechanism of the present invention.

FIGURE 2 is a fragmentary diagrammatic perspective looking downwardly at the drive mechanism on the top of the machine of FIG. 1.

FIGURE 3 is a diagrammatic perspective taken looking downwardly at the side of the processing units at stations 10 and 11 of the machine.

FIGURE 4 is a fragmentary diagrammatic plan showing a portion of a peeled grapefruit and the operative position of the pins of the shaking mechanism of the present invention.

The sectionizing machine 20 shown schematically in plan in FIG. 1 is completely disclosed in my above-mentioned Patent No. 3,148,717 and reference may be had to said patent for a description of the construction and operation of any mechanisms not completely described herein. Accordingly, said patent is incorporated by reference in the present application.

In general, the sectionizing machine 20 comprises a fixed base on which a table top 22 is mounted. Twelve fruit carriers 30 are mounted above the table top on a turret (not shown) that rotates about a vertical axis 29. A circular tool carrier 27 is mounted above the turret for vertical movement toward and away from the turret. When the tool carrier 27 is lowered and raised, it moves several fruit processing units mounted thereon into and out of engagement with fruit held in the twelve fruit carriers 30 which are mounted around the periphery of the turret at twelve equi-spaced positions designated as stations 1–12 in the plan view of FIG. 1. The fruit processing units include a first path cutter C1 at station 2, a second path cutter C2 at station 3, six sectionizing heads H1–H6 at stations 4–9 respectively, a fruit shaker S at station 10, a spinner T at station 11, and a core remover R at station 12. There is no fruit processing unit on the tool carrier 27 at station 1 since, at this station, the only operation that takes place is the depositing of a fruit in the carrier. Also mounted above the table top 22 is a fruit feed turret 31 and a transfer turret 32. A motor 40 (FIG. 2) is mounted on the upper surface of a tool carrier 27 and is operatively connected to a plurality of eccentric drive units 41a–41h for vertically reciprocating the blades of the sectionizing heads H1–H6 and the fingers of the path cutting heads C1 and C2.

During operation of the machine 20, grapefruit to be sectionized are advanced on a supply conveyor (not shown) to a point within reach of an operator who is positioned adjacent the feed turret 31. The operator places the grapefruit, one by one, on the feed turret at station A, said turret being arranged to be intermittently indexed through 90° annular movements in a clockwise direction to bring each grapefruit to a transfer station B where the fruit is automatically transferred from the feed turret to the transfer turret 32 which is also arranged to be intermittently indexed in 90° increments in synchronism with the movements of feed turret 31, but in a counterclockwise direction. The grapefruit is then moved station 1 of the main turret where it is deposited in one of the fruit carriers 30. The main turret (not shown) is arranged to be intermittently indexed through 30° angular increments in a clockwise direction (FIG. 1) about axis 29 to move the grapefruit successively to the twelve stations of the machine.

The feed turret 31 and the transfer turret 32 are identical to the feed and transfer turrets of the sectionizing machine disclosed in the patent to H. W. Grotewold No. 3,072,160. Since these turrets do not form part of the present invention, they will not be described in detail, however, reference may be had to the above-identified patent for a complete description of any mechanisms of the present machine that is not described herein in detail.

After a fruit has been processed by the path cutters C1 and C2 at stations 2 and 3, respectively, and has been acted on by the sectionizing blades of the six sectionizing heads at stations 4–9, it is moved to station 10. At this time a large portion of the pie-shaped sections of the fruit have been separated from the core and the membranes, but some connections remain. Also, a portion of the seeds have been loosened from the fruit and have dropped onto a discharge conveyor; however, some seeds still cling to the fruit sections. The shaking mechanism of the present invention is particularly adapted to engage the fruit at this time and shake the fruit sections and the seeds loose.

Accordingly, while the grapefruit is still retained in the carrier 30 by an inflated gripper (not shown), a group of small diameter pins 50 (FIG. 3) are inserted down into the fruit adjacent the apices of the sections as seen in FIG. 4, which also illustrates the engagement of fingers 48 and 49 of one of the path cutting units C1 and C2 with the fruit sections. The nine pins 50 of the shaker mechanism are arranged in a circular pattern and are mounted on the lower end of a shaft 51 that is rotatably journalled in a rigid support bearing 52 carried by the tool carrier 27. At its upper end, the shaft 51 passes through a tubular drive member 55 which is continuously oscillated, in a manner to be explained presently. At a point above the member 55, a cylindrical clutch member 57 is keyed to the shaft below a coil 58. The oscillating drive member 55 and the member 57 are parts of an electric clutch unit 59. When the clutch is energized, the drive member 55 is coupled to the member 57 to cause the shaft 51, and the pins 50 on the lower end thereof, to be rapidly oscillated at about 1400 cycles per minute in a range of from 15 to 30 degrees. This oscillating movement of the pins causes the pins to repeatedly contact that portion of the seeds disposed outwardly of the meat segments, and preferably near the outer ends of the seeds. It will be understood that, while the shaker is oscillating and breaking loose the seeds, the inflatable gripper is in the inflated condition and holds the separated segments together. While the shaker is still oscillating, the tool carrier 27 is raised, causing the gripper to be deflated in the manner explained in the above-mentioned patent. The shaker pins 50 are long enough so that they are still in the fruit when the holder is deflated. Accordingly, as a last operation, the oscillating pins 50 jar the pie-shaped fruit segments that have already been separated from their membranes but have been held together by the adhesion of the segments to each other. These loose sections then fall onto a conveyor system for further processing.

The drive member 55 of the clutch is oscillated by means of a crank plate 60 (FIG. 2) that is keyed to the output shaft 61 of a drive unit 62. The input shaft 63 of the drive unit is driven by a belt and pulley mechanism 64. The crank 60 is connected by a rod 67 (FIG. 3) to a crank arm 68 that is integrally formed on the drive member 55. The crank arm 68 is long compared to the throw of the crank plate 60 and, accordingly, the crank arm 68 will be oscillated while the crank plate 60 is rotated.

At station 11, the fruit is subjected to the action of the spinner T (FIG. 3) which comprises a plurality of pins 71 mounted on the lower end of a vertical shaft 72 which is rotatable in a fixed bearing 73. The upper end of the spinner shaft 72 passes through the drive member 75 of an electric clutch 76 and has the driven member 77 keyed thereon below a coil 78 and above the drive member which is continuously rotated by a belt and pulley drive mechanism 80 which has a belt 81 trained around a pulley 82 that is keyed to the output shaft 61 of the drive unit 62.

When the stripper pins 71 are lowered into the fruit, the clutch 76 is energized to move the rotating drive member 75 into driving engagement with the member 77 and cause the rotation of the pins, to strip the remaining meat segments from the membranes.

At station 12, the core and the membranes are removed from the prong unit by means of a core removal unit that is disclosed in the Grotewold Patent No. 3,072,160.

The control mechanism for actuating and coordinating the power units at stations 10 and 11 and for coordinating the actuation of these units with the other operating units including the inflatable grippers is described in the above-mentioned patent.

From the foregoing description it will be seen that the present invention provides a novel efficient apparatus for removing fruit sections from the core and the membranes of citrus fruit, and for removing seeds from citrus fruit.

While a particular embodiment of the present invention has been shown and described, it will be understood that the apparatus is capable of variation without departing from the principles of the present invention, and that the scope of the invention should be limited only by the scope and proper interpretation of the claims appended hereto.

What I claim as new and desire to protect by Letters Patent is:

1. In an apparatus for processing peeled citrus fruit while it is supported in holding means, said fruit having its pie-shaped sections substantially removed from the associated membranes, the improvement comprising an oscillating seed striker for loosening the seeds from the pie-shaped sections and for separating some of the pie-shaped sections from the membrane, means for oscillating said seed striker, and a spinner for stripping the membrane from the remaining sections.

2. The invention according to claim 1 wherein said striker and said spinner are mounted on a vertically reciprocating tool carrier, and drive means on said carrier for actuating said striker and said spinner.

3. The invention according to claim 1 wherein said striker and said spinner comprise circumferentially spaced pins carried on individual shafts.

References Cited
UNITED STATES PATENTS

| | | | |
|---|---|---|---|
| 2,129,101 | 9/1938 | Polk | 146—3 |
| 2,240,909 | 5/1941 | Polk et al. | 146—3 |
| 3,030,990 | 4/1962 | Polk | 146—3 |

WILLIAM W. DYER, JR., *Primary Examiner.*